(12) United States Patent
Ushijima et al.

(10) Patent No.: US 7,526,509 B2
(45) Date of Patent: Apr. 28, 2009

(54) INFORMATION LIFECYCLE MANAGING SYSTEM AND ITS DATA ARRANGEMENT DETERMINING METHOD

(75) Inventors: Kazutomo Ushijima, Kokubunji (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 383 days.

(21) Appl. No.: 10/991,528

(22) Filed: Nov. 19, 2004

(65) Prior Publication Data

US 2006/0059206 A1 Mar. 16, 2006

(30) Foreign Application Priority Data

Sep. 14, 2004 (JP) .............................. 2004-266167

(51) Int. Cl.
*G06F 12/00* (2006.01)
*G06F 17/30* (2006.01)
(52) U.S. Cl. .......................... 707/200; 707/10; 711/170
(58) Field of Classification Search ............... 707/1–10, 707/100–104.1, 200–206; 711/145, 156, 711/170, 173
See application file for complete search history.

(56) References Cited

U.S. PATENT DOCUMENTS

| | | | | |
|---|---|---|---|---|
| 6,847,970 | B2 * | 1/2005 | Keller et al. ................. | 707/100 |
| 7,007,048 | B1 * | 2/2006 | Murray et al. ............... | 707/204 |
| 2002/0026328 | A1 * | 2/2002 | Westerkamp et al. .......... | 705/2 |
| 2003/0172020 | A1 * | 9/2003 | Davies et al. ................. | 705/36 |

OTHER PUBLICATIONS

V.F.Russo et al., Virtual memory and backing storage management in multiprocessor operating systems using object-oriented design techniques, ACM, Oct. 1989, 267-278.*
Halvard Skogsrud et al., Trust-serv: model-driven lifecycle management of trust negotiation policies for web services, ACM, May 2004, 53-62.*
White Paper "Project Storage Migration", Enigma Data Systems Company, pp. 1-7, 2001.
EMC New Release concerning "DatabaseXtender", Prelss Release of Jan. 26, 2004, EMC Company.

* cited by examiner

*Primary Examiner*—Jean B Fleurantin
(74) *Attorney, Agent, or Firm*—Antonelli, Terry, Stout & Kraus, LLP.

(57) ABSTRACT

Even when information lifecycle management is applied to management object data of a database management system, inquiry service performance offered by the database management system can be guaranteed. Data arrangement managing system performs data arrangement settings in respect of management object data of the database management system and has a data arrangement setting creating module for determining possible data arrangement candidates and a data arrangement setting exchanging module for transferring the data arrangement candidates to the database management system. In the database management system, in respect of the individual data arrangement candidates transmitted to the database management system, execution profiles of service presupposing the candidates are created which are decided as to whether to satisfy a condition on database performance designated by a user and a narrowing down module narrows down the candidates to only data arrangement candidates satisfying the condition.

5 Claims, 9 Drawing Sheets

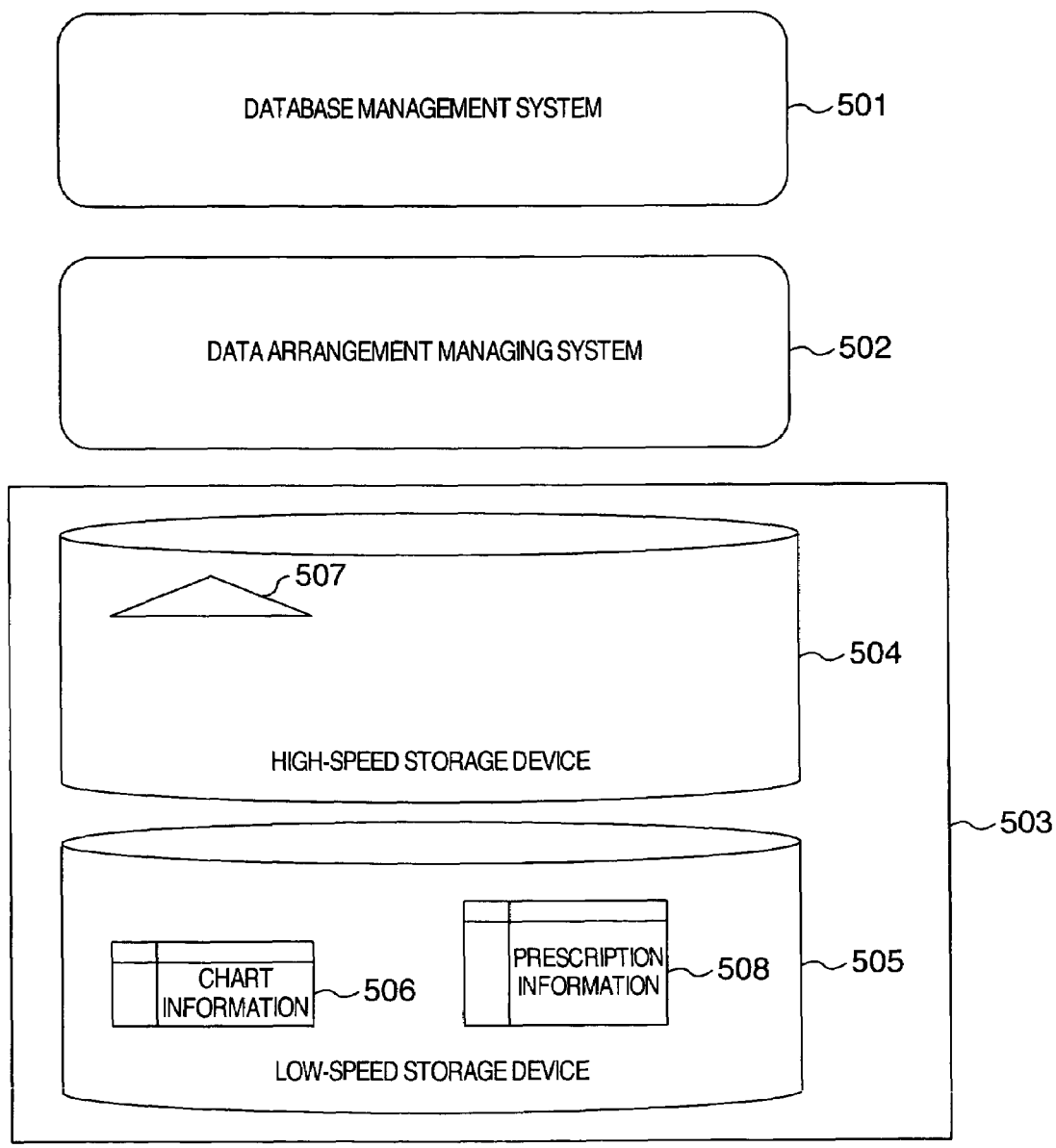

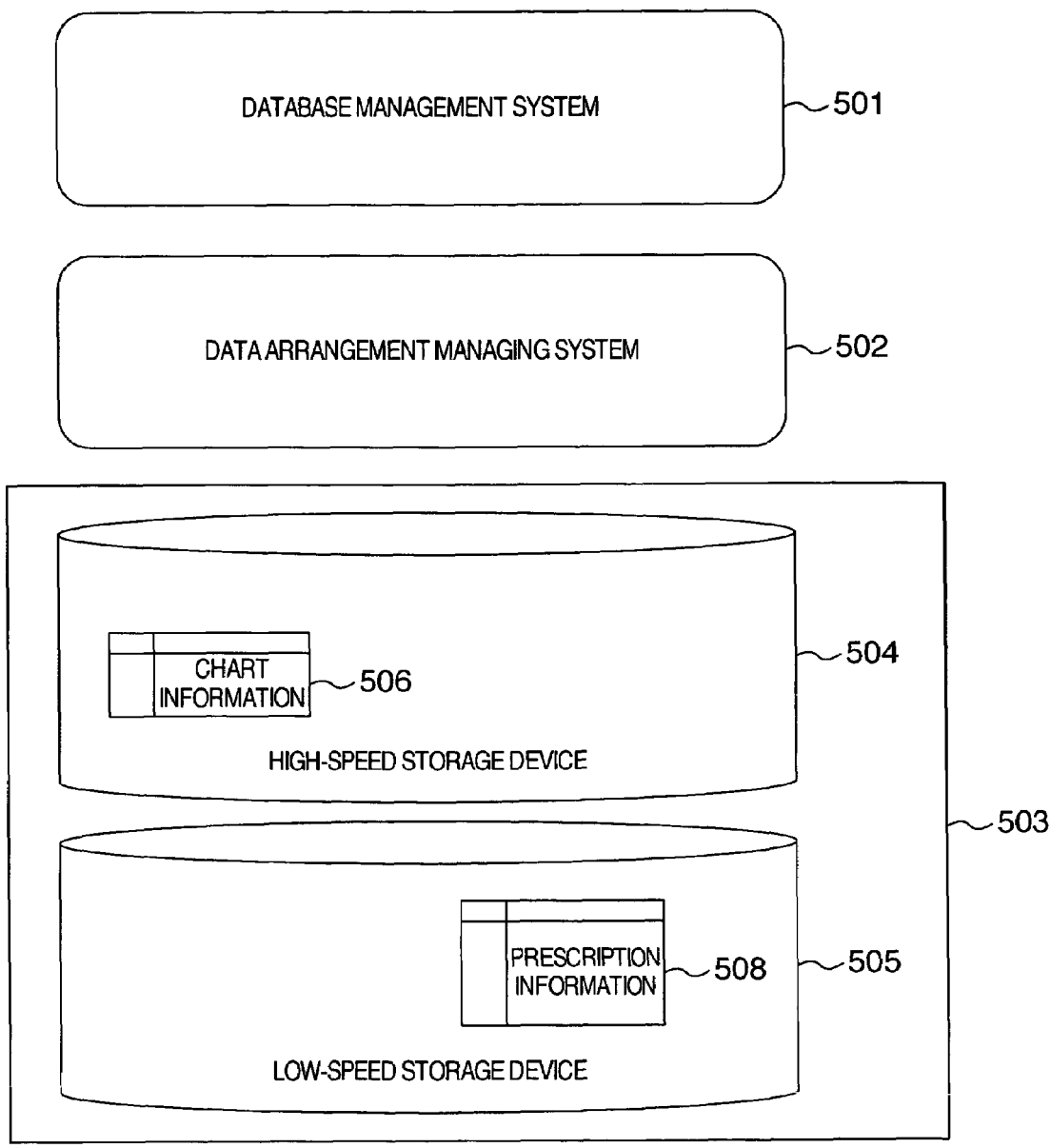

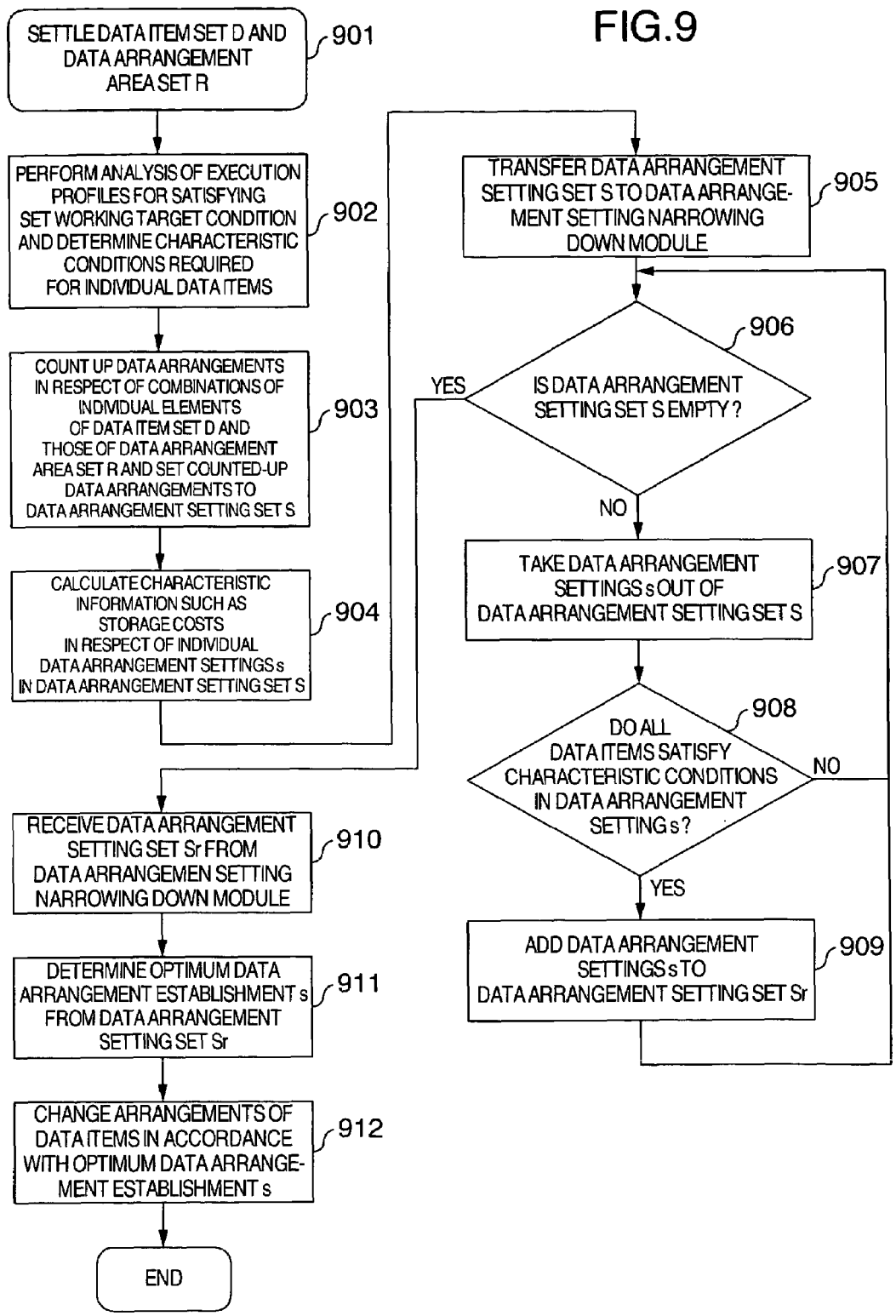

INFORMATION LIFECYCLE MANAGING SYSTEM AND ITS DATA ARRANGEMENT DETERMINING METHOD

INCORPORATION BY REFERENCE

The present application claims priority from Japanese application JP2004-266167 filed on Sep. 14, 2004, the content of which is hereby incorporated by reference into this application.

BACKGROUND OF THE INVENTION

The present invention relates to an information lifecycle managing system for determining a data management method in accordance of values of data and more particularly, to a system for performing data arrangement determination respecting performance during execution of a host application utilizing management object data by cooperating with the host application.

Generally, the information lifecycle management (ILM) is defined as "to manage information (data) such that the information can be utilized most efficiently on the basis of values created by the data in various phases beginning with creation of the data and ending in disposal thereof". For example, when this definition is applied to management of business data held by an information system in an enterprise, values created by all pieces of business data the enterprise possesses can be maximized and at the same time the cost required for holding or retaining the data can be minimized, leading to promotion of costs versus merits in the data management. The thus obtainable merits differ greatly depending upon what criteria the values created by the data are evaluated with and what policy the determination of a method for data management on the basis of the results of evaluation is based on.

For example, in a conventional standard information lifecycle managing method, a data administrator sets, in respect of individual pieces of data, attribute information such as the degree of importance and access frequency of the individual data and the ILM system side for determining arrangement position and management method of the data makes a decision by consulting the attribute information of the data. For example, by doing such a protocol as "data having a high degree of importance and being accessed frequently are stored in a highly reliable high-end storage, data having a high degree of importance but undergoing not so highly frequent access are stored in a storage of medium access speed and good cost performance and besides data having not so high a degree of importance is saved in a storage of low cost", the storage cost required for data retention can be reduced.

The aforementioned standard information lifecycle managing method is, however, confronted with problems that (1) much time and labor is consumed to set attribute information in respect of the individual pieces of data and (2) when the data arrangement position and retention mode are changed according to the attribute information, the influence the change has upon the execution performance of a host application utilizing the data cannot be anticipated.

According to a method called "Project Unit Data Management Method" and described in white paper concerning "Project Storage Migration" by Enigma Data Systems Company, 2001 (Internet:hppt://www1.enigmadata.com/pdf_files/ENIGMAPA PER_ Project_Storage_Migration.pdf), management object data are managed not individually but in a unit of group called project. Further, according to EMC News Release of Jan. 26, 2004 concerning "DatabaseXtender" by EMC company (Internet:hppt://www.emc.com/news/press_releases/view.j sp?id=2050), in a method called "Utility Utilization Data Management Method" and descried secondly, the access frequency in a unit of data is monitored by a dedicated utility so that data of low access frequency in a database may be moved in advance to a backup device.

SUMMARY OF THE INVENTION

As described above, the technologies are available which facilitate setting of attribute information of individual pieces of data for realization of information lifecycle management and consolidate commands to manage. These technologies, however, also fail to respect performance of a host application utilizing data subject to the information lifecycle management. Especially, when these technologies are applied to data managed by a database, there arises a problem that an optimum inquiry process is not always carried out because of a change in data arrangement and the performance changes to a great extent to fail to offer performance indispensable for applications.

Accordingly, it is an object of this invention to provide an information lifecycle managing system which can select and carry out only a data arrangement change so restricted as to guarantee performance during execution of service by such a host application as a database management system utilizing data subject to information lifecycle management.

A typical system to which this invention is applied has means for setting a working target condition which indicates a criterion to be guaranteed in service (for example, inquiry service in a database inquiry system) offered by a host application in order to make warrantable the performance of the service offered by the host application and means for exchanging information necessary for data arrangement determination between the host application and an ILM system.

More specified features of this invention will become apparent by a description of embodiments to be given hereunder.

When the present invention is applied to, for example, management object data in a database management system, by merely letting a user designate a condition needed in connection with performance of database inquiry service, a data arrangement can be set within a range in which the designated performance can be guaranteed, with the result that attribute information such as a degree of importance of data need not be designated in a unit of individual pieces of data and besides, even when the data arrangement is changed, the performance concerning inquiry service offered by the database management system can be guaranteed.

In an information lifecycle managing system in which this invention is applied to information lifecycle management of management object data of a database management system, with a view to alleviating a setting procedure on the user side necessary for guaranteeing performance of inquiry service in the database management system representing a host application, a level of the performance required to be guaranteed is designated directly to the database management system and the database management system decides permissibility/impermissibility of the performance guarantee in individual data management settings or offers a condition necessary for the permissibility/impermissibility decision.

Other objects, features and advantages of the invention will become apparent from the following description of the embodiments of the invention taken in conjunction with the accompanying drawings.

BRIEF DESCRIPTION OF THE DRAWINGS

FIG. 7 is a diagram showing still another example of the arrangement in FIG. 5.

FIG. 8 is a diagram showing still another example of the arrangement in FIG. 5.

FIG. 9 is a process flowchart of the whole of a data item arrangement position determining process according to a second embodiment of the invention.

DESCRIPTION OF THE EMBODIMENTS

The present invention will now be described by way of example with reference to the accompanying drawings.

Embodiment 1

Figure 1:
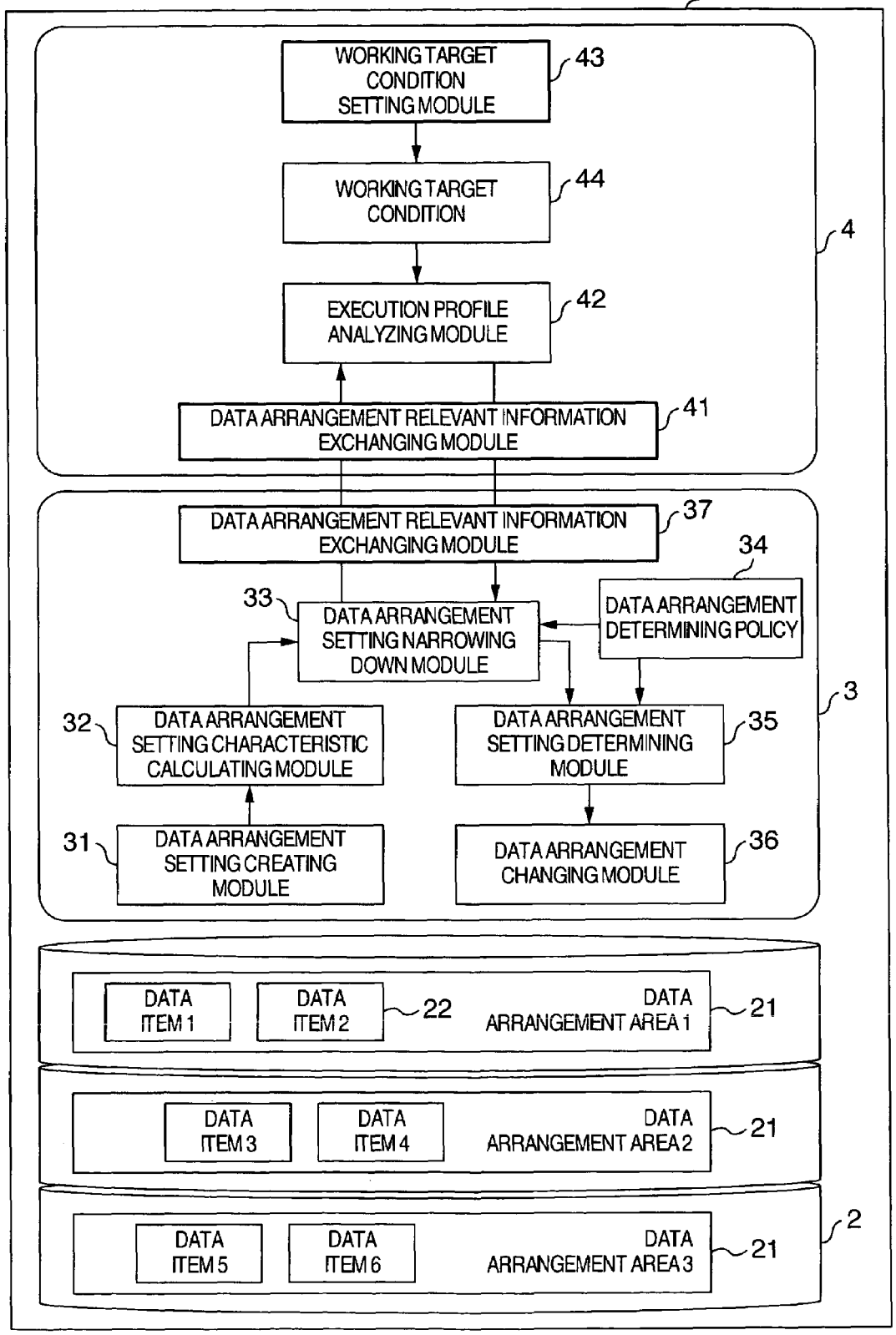
FIG. 1 is a schematic diagram showing an information lifecycle managing system according to this invention.

FIG. 1 illustrates an overall configuration of an embodiment in which this invention is applied to information lifecycle management of management object data in a database management system. A data arrangement managing system 3 intends to arrange a plurality of data items 22 subject to management in any of a plurality of data arrangement areas 21 having different bit unit costs, respectively, in accordance with utilization conditions of the individual data items to thereby reduce the overall storage cost. In determining arrangement of the individual data items in the individual data arrangement areas, the data items are consulted and a database management system 4 offering inquiry service is cooperated with so as to perform an arrangement determination restricted to a range in which a working target condition set on the database management system may be satisfied. Through this, inquiry service offered by the database management system can be prevented from falling below the designated working target condition when the data arrangement changes.

A complex storage unit 2 in FIG. 1 represents a set of various storage units for holding the data items 22 which are not only managed by the data arrangement managing system 3 but also consulted by the database management system 4. Here, the composite storage unit 2 has the plurality of data arrangement areas 21 mutually differing in bit unit costs of data holding or retention and costs of data retrieval and update as well as times required for this purpose. For example, each of the data arrangement areas is a RAID disk system, an ATA disk system or a magnetic tape device. The database management system 4 refers to the data item group held by the composite storage unit 2 to offer inquiry service such as retrieval and update of information. The data arrangement managing system 3 carries out managing arrangements of these data items.

Functional modules constituting the data arrangement managing system 3 function as will be described below. A data arrangement setting creating module 31 creates a data arrangement setting group (data arrangement settings) in the form of combinations of the aforementioned data items and data arrangement areas. In respect of the individual data arrangement settings created by the data arrangement setting creating module 31, a data arrangement setting characteristic calculating module 32 calculates characteristic information including the total of storage costs from, for example, sizes of data items arranged in the respective data arrangement areas. A data arrangement setting narrowing down module 33 consults a data arrangement determining policy 34 designated in advance as well as information offered from the database management system 4 to narrow down the data arrangement settings, the characteristic information pieces of which are calculated by the data arrangement setting characteristic calculating module 32, to chosen data arrangement settings. A data arrangement setting determining module 35 consults the data arrangement determining policy 34 to determine an optimum data arrangement setting or establishment from the data arrangement settings chosen and narrowed down by the data arrangement setting narrowing down module. A data arrangement changing module 36 arranges the data items in accordance with the combinations of the data items and data arrangement areas which are made to correspond with each other in the chosen data arrangement settings settled by the data arrangement determining module. The data arrangement determining policy 34 includes evaluation criterions for deciding superiority/inferiority of the individual data arrangement settings in the light of working policies the user considers. A data arrangement relevant information exchanging module 37 transfers the created and narrowed down data arrangement settings to the database management system 4.

Next, functional modules constituting the database management system 4 will be described. A data arrangement relevant information exchanging module 41 exchanges the information about the data arrangement settings with the data arrangement managing system. When offering inquiry service in respect of the individual data arrangement settings of data arrangement setting group the data arrangement relevant information exchanging module has acquired, an execution profile analyzing module 42 creates an execution profile such as database setting and inquiry execution plan and decides whether inquiry service satisfying a working target condition 44 preset by using a working target condition setting module 43 can be offered.

Figure 2:
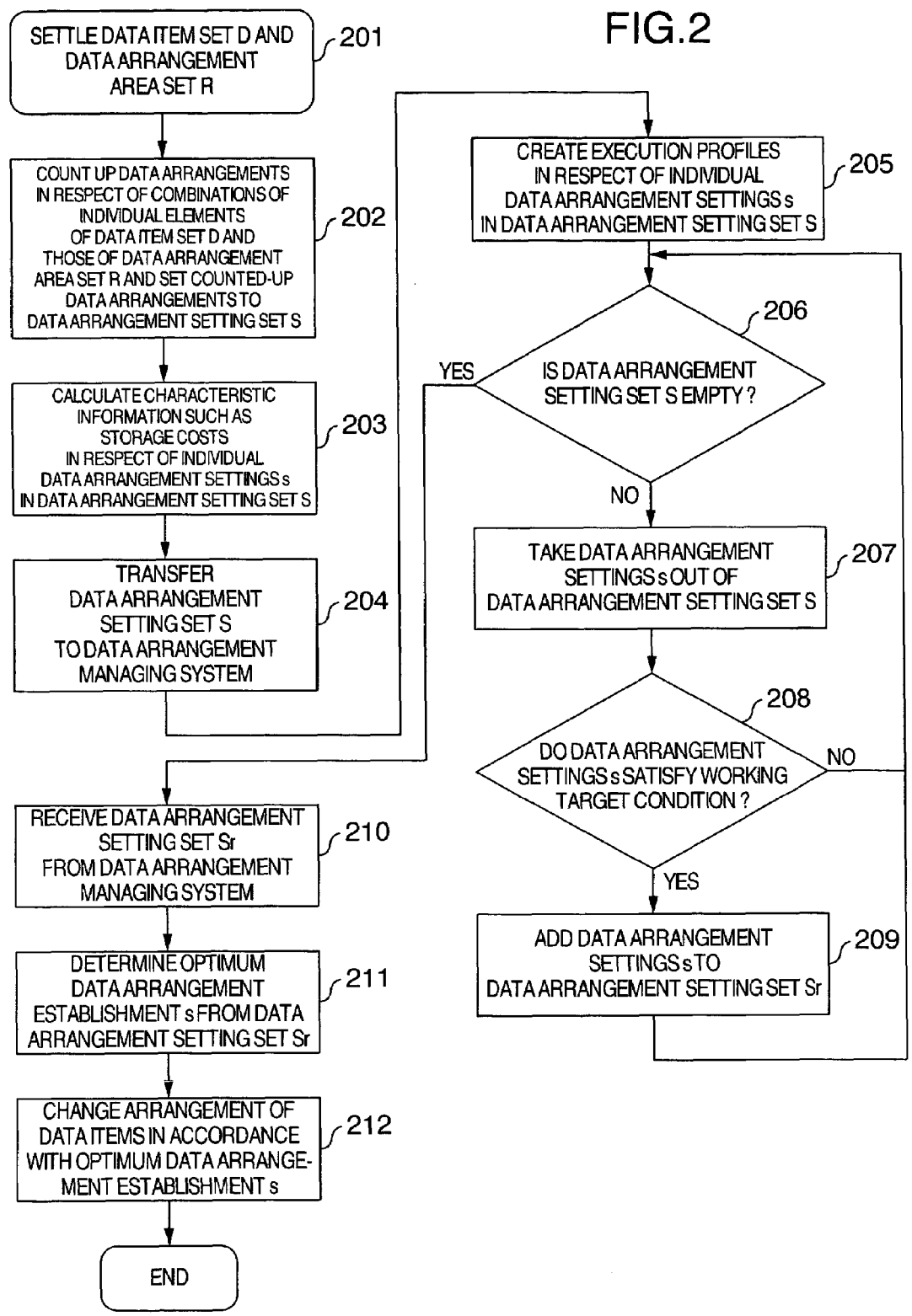
FIG. 2 is a process flowchart of the whole of a data item arrangement position determining process according to a first embodiment of the invention.

FIG. 2 shows a process flow of the whole of a data item arrangement position determining process in the present embodiment. Firstly, prior to data arrangement position determination, combinations of a set of data items managed by the data arrangement managing system 3 and a set of data arrangement areas in which these data items can be arranged are settled, respectively (201). While allowing for sizes of the data arrangement areas in respect of the individual data items in the data item set, the data arrangement setting creating module 31 counts up all combinations which can be allowed for arrangement and registers the possible combinations into a data arrangement setting set (202). In this phase, individual data arrangement settings are expressed in terms of a set of combinations in which the individual data items are made to correspond with the data arrangement areas representing arrangement destinations of the data items (correspondence table). The individual data arrangement settings counted up by the data arrangement setting creating module 31 are taken over to the data arrangement setting characteristic calculating module 32. In respect of the individual data arrangement settings, the data arrangement setting characteristic calculating module 32 adds up the products of consumptive storage sizes to be consumed by the data items to be arranged in the individual data arrangement areas and bit unit costs of the data arrangement areas to calculate the sum total of consumptive storage costs as characteristic information (203). Subsequently, the data arrangement setting set, for which characteristic information pieces of the individual data arrangement settings are calculated by means of the data arrangement setting characteristic calculating module 32, is taken over to the database management system 4 through the data arrangement setting narrowing down module 33, data arrangement relevant information exchanging module 37 on the data arrangement managing system side and data arrangement relevant information exchanging module 41 on the database management system side (204).

In an alternative, the data arrangement setting narrowing down module 33 may not transfer all data arrangement settings subject to characteristic information calculation to the database management system 4 but may consult the data arrangement determining policy 34 to delete data arrangement settings decidable as being unmeet for the data arrangement determining policy at that time point from the data arrangement setting set, thus enabling a narrowed down data arrangement setting set to be taken over to the data management system.

With the data arrangement setting set transferred to the database management system 4, the execution profile analyzing module 42 first creates, on the presupposition of the individual data arrangement settings, predictable execution profiles concerning execution time and backup time of inquiry service the database management system can offer (205). Further, the execution profile analyzing module 42 decides whether the execution profiles created in respect of the individual data arrangement settings satisfy the working target condition 44 registered in advance through the working target condition setting module 43 (208). Then, in connection with data arrangement settings for which the decision result is false, the data are deleted from the arrangement setting set to narrow down the data arrangement setting set (209). After narrowing-down has been applied to all data arrangement settings in the data arrangement set (206, 207), a data arrangement setting set Sr is obtained which in turn is taken over to the data arrangement determining module 35 through the medium of the data arrangement setting exchanging module 41, data arrangement setting exchanging module 37 and data arrangement setting narrowing down module 33 (210).

The data arrangement setting determining module 35 consults the data arrangement determining policy 34 to determine an optimum data arrangement establishment from the received data arrangement setting set Sr (211). The data arrangement establishment now determined is taken over to the data arrangement changing module so that data items may be moved in accordance with the correspondence relation between the individual data items and data arrangement areas registered in the correspondence table (212).

Figure 3:
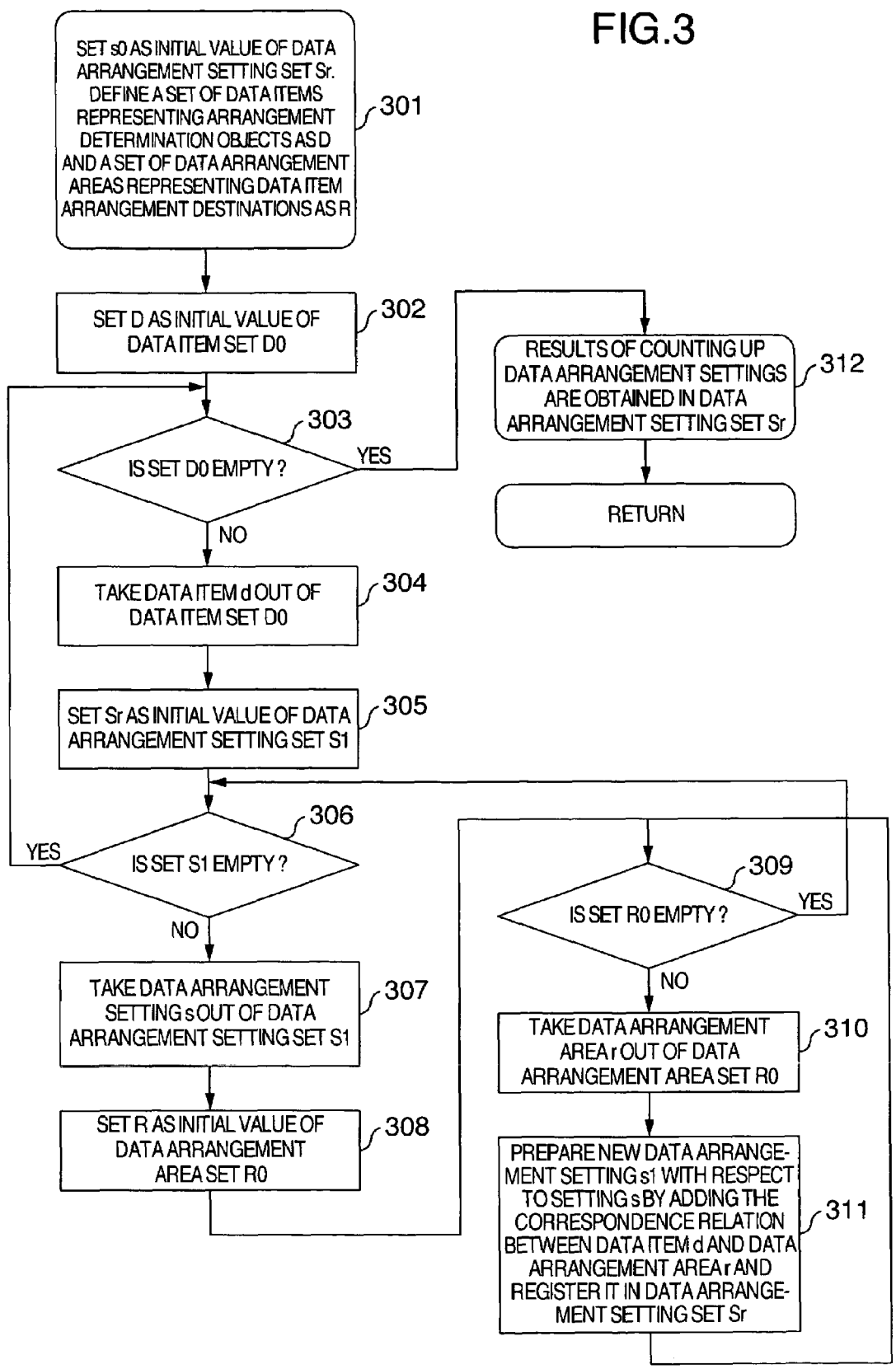
FIG. 3 is a flowchart of a portion for counting up data arrangement settings in a data arrangement setting creating module.

FIG. 3 shows a flowchart of a subroutine of the data arrangement setting counting up step in the data arrangement setting creating module. Firstly, as an initial value of data arrangement setting set Sr, a data arrangement setting s0 including no correspondence relation between data items and data arrangement areas is set. Concurrently, with a set of data items subject to data arrangement setting count-up defined as D and a set of data arrangement areas defined as R (301), D is set as an initial value of working data item set D0 (302). If the set D0 does not contain any data item (303), the results of counting up the target data arrangement settings are obtained in the data arrangement setting set Sr and therefore the subroutine ends (312). If data item d is contained in the set D0 (303), the data item d is taken out of the set D0 (304). As an initial value of data arrangement setting set S1, Sr is set (305) and if the set S1 does not contain any data arrangement setting (306), the program returns to the step (303). In case the set S1 contains data arrangement setting s (306), the data arrangement setting s is taken out of the set S1 (307). Subsequently, as an initial value of the data arrangement area set R0, R is set (308) and if the set R0 does not contain data arrangement area r (309), the program returns to the step (306). In case the set R0 contains the data arrangement area r (309), the data arrangement area r is taken out of the set R0 (310) and in connection with the data arrangement setting s, new data arrangement setting s1 added with the correspondence relation between data item d and data arrangement area r is prepared and added to the data arrangement setting set Sr and the program returns to the step (309).

Figure 4:
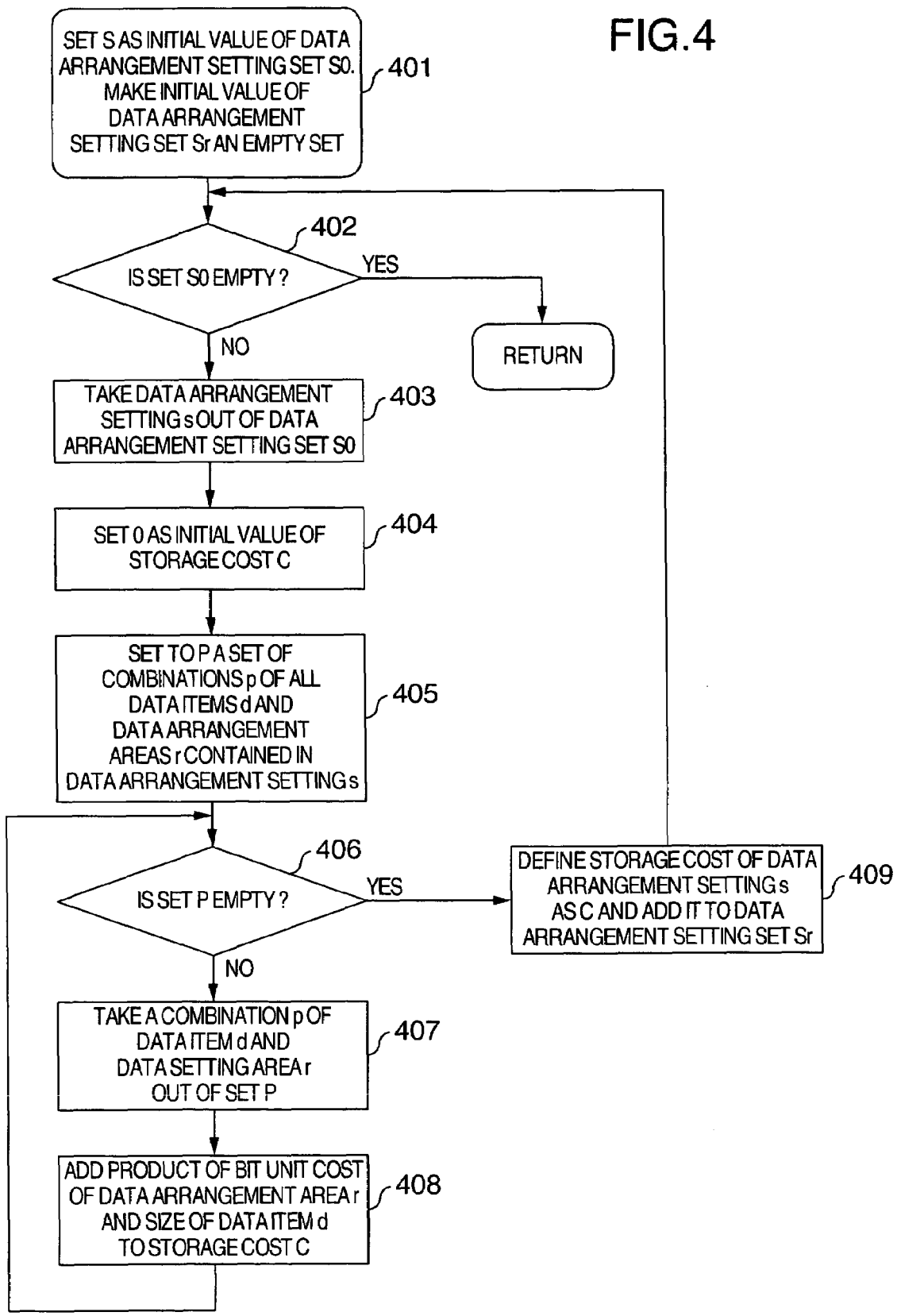
FIG. 4 is a flowchart of storage cost calculation in a storage cost calculating module.

FIG. 4 shows a flowchart of a subroutine for storage cost calculation in the data arrangement setting characteristic calculating module 32. Firstly, with a set of data arrangement settings subject to storage cost calculation defined as S, an empty set is set as an initial value of the resulting data arrangement setting set Sr and S is set as an initial value of data arrangement setting set S0 (401). If the set S0 does not contain any data arrangement setting (402), indicating that storage cost calculation is ended, the set Sr is made to be resulting data arrangement settings and the subroutine ends. If the set S0 contains data arrangement setting s (402), the data arrangement setting s is taken out of the set S0 (403). After the value of storage cost C has been reset to 0 (404), a set of combinations p of data items d and data arrangement areas r contained in the data arrangement setting s is defined as P (405). If the set P does not contain any combination of data item and data arrangement area (406), the storage cost in data arrangement setting s is defined as C, the setting s is added to the resulting data arrangement setting set Sr and the program returns to the step (402) (409). In case the set P contains combination p of data item and data arrangement area (406), the combination p is taken out of the set P (407), the product of bit unit cost of data arrangement area r and size of data item d is added to the storage cost C (408) and the program returns to the step (406).

In an instance to be described hereunder, the data arrangement determining method in the present embodiment is applied to a concrete example of business data management in which patient's chart information (personal medical examination and treatment records) and prescription information (medical examination and treatment reward details) in a hospital information system are managed.

Figure 5:
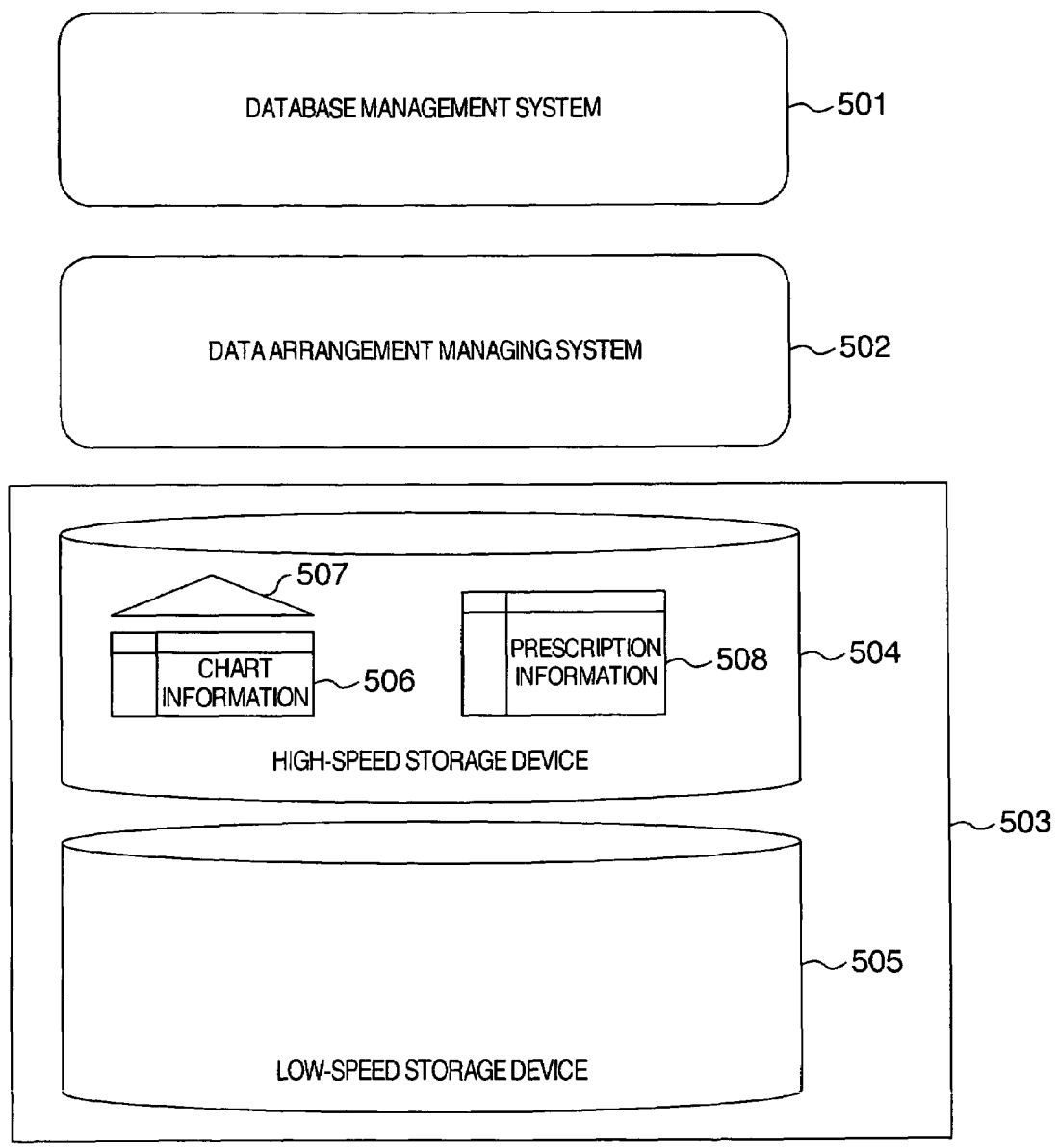
FIG. 5 is a diagram showing an example of arrangement of patient's chart information and prescription information in a hospital information system.

In this hospital information managing system, two kinds of storage devices of high-speed storage device 504 of high bit unit cost (bit unit cost=20) and low-speed storage device 505 of low bit unit cost (bit unit cost=10) are provided as shown in FIG. 5 and the chart information and prescription information are held in these storage devices, respectively. In this type of hospital information managing system, pieces of chart information corresponding to visiting patients are consulted any time consistently with day-by-day diagnosis and treatment service and besides, a process for statistically analyzing pieces of prescription information is carried out day by day with a view to discussing improvements in hospital management. In accessing the chart information, data acquisition performed by designating a patient ID is principal and therefore, an index for access speed-up accompanying data proper is prepared. In this example, a data storage area corresponding to 10 pages is assured in each of the high-speed storage device 504 and low-speed storage device 505, with the size of data proper 506 of chart information being 6 pages, the size of index 507 being 4 pages and the size of data proper 508 of prescription information being 10 pages.

Figure 6:
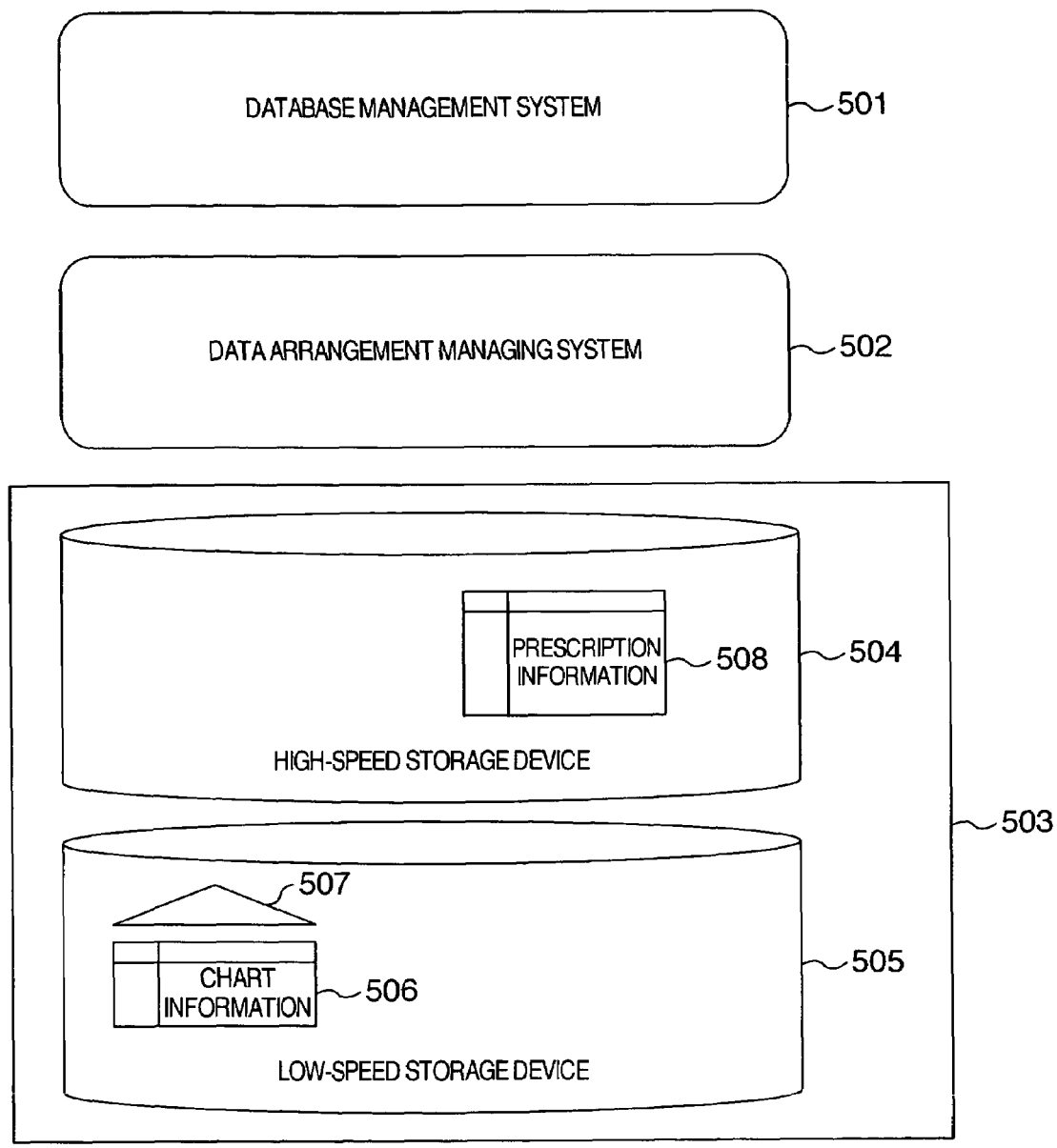
FIG. 6 is a diagram showing another example of the arrangement in FIG. 5.

Then, by moving part of the business data to the cheap low-speed storage device 505, the total storage cost can be reduced. On the assumption that the data arrangement is determined in accordance with a data referring number (frequency) per page, the "chart information" consulted by only the number of visiting patients is smaller in referring number than the "prescription information" for which data pieces of all patients are consulted each time the statistical analysis process is carried out and is therefore allotted with low priority. Accordingly, in this case, there is a possibility that the data proper 506 and index 507 of the chart information are moved to the low-speed storage device as shown in FIG. 6 (storage cost=300). But, in acquisition of the statistical analyzing process results, no serious problem occurs in business even if time is prolonged by several minutes but there is presupposed that such a target condition on working that acquisition of electronic chart data necessary for daily diagnosis and treatment service should be completed within 5 seconds. In case this target condition is fulfilled, the data arrangement shown in FIG. 6 does not matter but if the target condition is unfulfilled, another data arrangement method must be studied.

In such a case, if inquiry performance allowing for the storage performance and data size is estimated and the working target condition is satisfied, only the index 507 for narrowing down object data is removed from the chart information and left behind in the high-speed storage device and the chart information data proper 506 is moved to the low-speed storage device as shown in FIG. 7 (storage cost=240) or as shown in FIG. 8, the index is deleted to arrange only the chart information proper in the high-speed storage device and the procedure for retrieval of the chart information is so changed as to be based on table scan (storage cost=220), thereby ensuring that the storage cost can further be reduced.

As described above, in embodiment 1, the setting procedure on the user side necessary for guaranteeing the performance of inquiry service in the database management system representing a host application in the information lifecycle managing system can be mitigated. More specifically, the level of performance needed to be guaranteed is designated directly to the database management system and in respect of individual possible data arrangements enumerated on the side of the data arrangement managing system, the database management system decides permissibility/impermissibility of the performance guarantee individually or offers conditions necessary for the permissibility/impermissibility decision, thus attaining the aforementioned advantages.

Embodiment 2

Another embodiment of the database management system utilizing the data arrangement determining method in this invention will be described hereinafter. The present embodiment differs greatly from the first embodiment in the data arrangement relevant information exchanged between the data arrangement managing system (3) and database management system (4) shown in FIG. 1.

FIG. 9 shows a process flow of the whole of a data item arrangement position determining process in the second embodiment.

Firstly, prior to data arrangement position determination, combinations of a set of data items managed by the data arrangement managing system and a set of data arrangement areas in which the data items can be arranged are settled individually (901). On the other hand, the execution profile analyzing means consults a working target condition (44) set by using the working target condition setting module (43) to calculate characteristic conditions for the individual data items necessary for satisfying the working target condition concerning execution time of inquiry service offered by the database management system and backup time of database data and transfers the calculated characteristic conditions to the data arrangement managing system through the data arrangement relevant information exchanging module on both sides of the database management system and data arrangement managing system (902).

Subsequently, in respect of the data items in the data item set, the data arrangement setting creating module counts up all combinations of possible arrangements while respecting sizes of the data arrangement areas and the like and registers the counted up combinations in the data arrangement setting set (903). At that time, the individual data arrangement settings can be expressed in terms of a set of combinations in which the individual data items make the correspondence with the data arrangement areas representing arrangement destinations of the data items (correspondence table). The individual data arrangement settings counted up by the data arrangement setting creating module are taken over to the data arrangement setting characteristic calculating module so that in respect of the individual data arrangement areas, characteristic information such as storage costs may be calculated from the products of consumptive storage sizes to be consumed by data items arranged in the corresponding data arrangement areas and bit unit costs of the data arrangement areas (904).

Then, the data arrangement setting set in which pieces of characteristic information of the individual data arrangement settings are calculated by the data arrangement setting characteristic calculating module is transferred to the data arrangement setting narrowing down module, so that data arrangement settings which are decidable as being unmeet for the data arrangement determining policy at that time point by consulting the data arrangement determining policy may possibly be deleted from the data arrangement setting set (905). Further, the database arrangement setting narrowing down module decides whether the individual data arrangement settings satisfy the characteristic conditions concerning data items transferred from the database management system (908).

In this phase, in respect of data arrangement settings for which the decision results are false, the data are deleted from the data arrangement setting set to thereby perform narrowing-down of the data arrangement setting set (909). After narrowing-down applied to all data arrangement settings in the data arrangement setting set has been completed, the data arrangement setting set in steps (906, 907) is taken over to the data arrangement determining module (910) and the data arrangement determining module consults the data arrangement determining policy to determine an optimum data arrangement establishment from the transferred data arrangement setting set (911). The data arrangement establishment determined herein is taken over to the succeeding data arrangement changing module so that the data items may be moved in accordance with the correspondence relation between the individual data items and data arrangement areas registered in the correspondence table (912).

The data arrangement determining method has been set forth so far by way of embodiments of the invention and this invention is in no way limited thereto.

According to this invention, by merely presetting a condition the service performance of an application system must satisfy, the data arrangement setting can be selected within the range in which the condition is satisfied and the data arrangement can be settled and therefore the information lifecycle management constantly respecting the service performance can be carried out to promote applicability to the field of interest.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information lifecycle managing system comprising a composite storage unit having a plurality of physically different data storage devices of different bit unit costs and characteristics;
   a data placement management system for managing placements of managed data objects to be stored in (data items) to said data storage devices; and
   an application system for offering service by utilizing said managed data objects,
   said application system including:
   working target condition setting means for setting a working target condition said service must satisfy; and
   a data placement relevant information exchanging unit which exchanges information to be used for determination of data placement in said data storage devices with said data placement management system,
   wherein said data placement management system includes:
   a data placement setting creating unit which creates a plurality of data placement settings of said managed data objects in respect of said data storage devices in said composite storage unit;
   a data placement setting characteristic calculating unit which calculates, in respect of said individual created data placement settings, characteristic information such as utilized storage costs from bit unit costs of said individual data storage devices and sizes of managed data objects arranged in said data storage devices;
   a data placement settings narrowing down unit which narrows down said plurality of data placement settings by consulting a preset data placement determining policy and information offered from said system and utilized for said data placement determination;
   a data placement determining unit which determines an optimum data placement establishment from said narrowed down data placement settings in accordance with said data placement determining policy; and
   a data placement changing unit which changes physical placement of managed data objects in the physically different data storage devices in accordance with each of pairs of the managed data objects and data storage devices which are made to correspond with each other in the data placement establishment determined by said data placement determining means,
   wherein said application system further includes an execution profile analyzing unit which decides whether said working target condition is observed (complied) by consulting: (1) said working target condition; and (2) an execution profile which is execution performance information of said application system which is predicted (estimated) when the data placement is acquired through said data placement relevant information exchanging means.

2. An information lifecycle managing system comprising:
   a composite storage unit having a plurality of data storage devices of different bit unit costs and characteristics;
   a data placement management system for managing placements of managed data objects to said data storage devices; and
   a database management system for offering inquiry service by utilizing said managed data objects,
   wherein said data placement management system includes:
   a data placement setting creating unit which creates a plurality of data placement settings of said managed data objects in respect of said data storage devices in said composite storage unit;
   a data placement setting characteristic calculating unit which calculates, in respect of said plurality of created data placement settings, characteristic information such as utilized storage costs from bit unit costs of said individual data storage devices and sizes of managed data objects arranged in said data storage devices;
   a data placement relevant information exchanging unit which transfers said plurality of data placement settings to said database management system and receives information for data placement determination from said database management system;
   a data placement setting narrowing down unit which narrows down said plurality of data placement settings in accordance with the information for data placement determination offered from said database management system through said data placement relevant information exchanging unit;
   a data placement determining unit which determines an optimum data placement establishment from the narrowed down data placement settings in accordance with a preset data placement determining policy; and
   a data placement changing unit which changes placement of the managed data objects in the data storage devices in accordance with each of pairs of the managed data objects and data storage devices which are made to correspond with each other in the data placement establishment determined by said data placement determining unit, and
   wherein said database management system includes:
   a working target condition setting unit which sets a working target condition said service must satisfy; and
   an execution profile analyzing unit which creates, in respect of each of said individual plural data placements settings offered from said data placement managing system through said data placement relevant information exchanging unit, an execution profile which is execution performance information concerning performance of inquiry service which can be offered by said database management system and which is predicted (estimated) when the data placements setting is used, decides whether said execution profile satisfies the working target condition, when the decision result is false, deletes said data placements setting from said plural data placements settings, and transfers the result of said deleting to said data placement setting narrowing down unit through said data placement relevant information exchanging unit.

3. An information lifecycle managing system according to claim 2, wherein the data storage devices are physically different data storage devices and wherein the data placement changing means is adapted to change physical placement of the managed data objects in different ones of the physically different data storage devices.

4. An information lifecycle managing system comprising:
- a composite storage unit having a plurality of data storage devices of different bit unit costs and characteristics;
- a database placement managing system for managing placements settings of managed data objects to said physically different data storage devices; and
- a database management system for offering inquiry service by utilizing said management object data,
- wherein said data placement managing system includes:
- a data placement setting creating unit which creates a plurality of data placement settings of said management object data to said data storage devices in said composite storage unit;
- a data placement setting characteristic calculating unit which calculates, in respect of said plurality of created data placement settings, characteristic information such as utilized storage costs from bit unit costs of said individual data storage devices and sizes of managed data objects arranged in said data storage device;
- a data placement relevant information exchanging unit which transfers a plurality of data items managed by said data placement managing system to said database managing system and receives information for data placement determination from said database management system;
- a data placement setting narrowing down unit which narrows down said plurality of data placement settings in accordance with information for data placement determination offered from said database management system through said data placement relevant information exchanging means;
- a data placement determining unit which determines an optimum data placement establishment from the narrowed down data placement settings in accordance with a preset data placement determining policy; and
- a data placement changing unit which changes the physical placement of the managed data objects in the physically different data storage devices in accordance with each of pairs of the managed data objects and data placement areas which are made to correspond with each other in the data placement establishment determined by said data placement determining means, and
- wherein said database management system includes:
- a working target condition setting unit which sets a working target condition said service must satisfy; and
- an execution profile analyzing unit which calculates, in respect of each of said plurality of data items managed by said data placement managing system, characteristic conditions necessary for satisfying said working target condition and transfers said characteristic conditions, as information for said data placement determination, to said data placement setting narrowing down unit through said data placement relevant information exchanging unit.

5. A data arrangement determining method for use in an information lifecycle managing system having a composite storage unit having a plurality of data storage devices of different bit unit costs and characteristics, a data placement managing system for managing placement settings of managed data objects to said data storage devices, and a database management system for offering inquiry service utilizing said managed data objects, said method comprising the steps of:
- settling, as a data placement setting set, combinations of a set of data items managed by said data placement managing system and a set of data storage devices in which said data items can be stored;
- calculating the total of consumptive storage costs by summing up the products of bit unit costs of the individual data storage devices representing placement destinations and sizes of the data items to be in respect of the individual data placement settings;
- transferring said data placement setting set to said database management system and preparing, in respect of the individual data placement settings, execution profiles of inquiry service which can be offered by said database management system when the individual data items are stored in said data placement settings;
- deciding whether the execution profiles for the individual data placement settings satisfy a preset working target condition and deleting data placement settings dissatisfying the working target condition from said data placement setting set;
- determining an optimum data placement establishment from a data placement setting set narrowed down by deletion in accordance with a preset data placement determining policy; and
- physically moving data items between the physically different data storage devices in accordance with the correspondence relation between each of pairs of data items and data storage devices which are indicated by the determined data placement establishment.

* * * * *